United States Patent [19]

Koike et al.

[11] Patent Number: 5,378,739
[45] Date of Patent: Jan. 3, 1995

[54] EMULSION INK FOR USE IN STENCIL PRINTING

[75] Inventors: Masahiro Koike; Hitoshi Ueda; Hiroshi Tateishi; Naohito Shimota, all of Numazu; Fumiaki Arai, Mishima, all of Japan

[73] Assignee: Ricoh Company, Ltd., Tokyo, Japan

[21] Appl. No.: 969,422

[22] Filed: Oct. 30, 1992

[30] Foreign Application Priority Data

Nov. 1, 1991 [JP] Japan .................................. 3-313335

[51] Int. Cl.⁶ .............................................. C03C 17/00
[52] U.S. Cl. ..................... 523/161; 523/160; 106/20 R; 106/25 R; 106/26 R; 106/30 R; 106/32; 524/77
[58] Field of Search ................ 106/20 R, 25 R, 26 R, 106/30 R, 32; 523/161, 160; 524/77

[56] References Cited

U.S. PATENT DOCUMENTS 4,329,262  5/1982  Muller ................................. 523/161
4,749,506  6/1988  Kitahara et al. .................... 523/200

FOREIGN PATENT DOCUMENTS 61-255967  11/1986  Japan ......................... C09D 11/02

*Primary Examiner*—John Kight, III
*Assistant Examiner*—Richard Jones
*Attorney, Agent, or Firm*—Cooper & Dunham

[57] ABSTRACT

A W/O emulsion ink for use in stencil printing is composed of an oil phase and a water phase with the respective ratios by wt. % thereof being (20 to 40):(80 to 60). The oil phase is composed of a solvent component containing a volatile solvent with an initial boiling point of 150° to 210° C. and a nonvolatile solvent, with the respective ratios by wt. % thereof being (10 to 30):(90 to 70), a coloring agent, a resin, and a surface-active agent, with the amount of the resin in the oil phase being in the range of 2 to 8 wt. % of the total weight of the emulsion.

4 Claims, No Drawings

EMULSION INK FOR USE IN STENCIL PRINTING

BACKGROUND OF THE INVENTION

1. Field of the Invention

The present invention relates to an emulsion ink for use in stencil printing, particularly to a W/O emulsion ink which is applicable to a rotary press of central cylinder type.

2. Discussion of Background

In the stencil printing method, an emulsion ink for use in stencil printing is applied to one surface of a stencil paper which is prepared by perforation in accordance with the desired original images, and the emulsion ink applied to a perforated portion of the stencil paper is allowed to pass through the stencil paper, thereby achieving the print of images on the surface of an image-receiving medium such as a sheet of paper.

In recent years, in line with the trend toward simple mechanism and compact size of the printing system, the dual drum type press has been switched over to the central cylinder type press in the stencil printing. The rotary press of the dual drum type is designed not to supply the surface of the stencil paper with an excessive amount of ink, so that a soft ink can be used for printing. With the rotary press of central cylinder type, however, there is the problem that a press roll or a printed matter becomes stained with the ink flowing to the end portion of a master plate when a soft ink is used for printing.

In addition, a high boiling solvent such as a non-drying oil, or a nonvolatile mineral oil, for example, motor oil, liquid paraffin, spindle oil, machine oil or castor oil is contained in the conventional ink composition so as to prevent the evaporation of the ink composition while it is allowed to stand on the cylinder. This means the prevention of clogging of the perforated portions of the stencil paper after printing. However, when the conventional W/O emulsion ink composition is allowed to stand in the stencil printing press, only the water content evaporates. The balance between the water content and the oil content is destroyed, and the amount ratio of the oil content is relatively increased. As a result, the viscosity of the ink composition is decreased, and the ink is softened. The density of printed images becomes excessively high, and therefore, an offset phenomenon and blurred images are caused.

There are many proposals to solve the above-mentioned problems. For example, Japanese Laid-Open Patent Application 61-255967 discloses a W/O emulsion ink for stencil printing, comprising an oil phase and a water phase at the ratio by wt. % of (10 to 50):(90 to 50), with the oil phase containing a solvent having a boiling point of 180 to 270° C. in an amount of 5 wt. % or more, preferably 10 wt. % or more of the entire weight of the water phase.

In the above disclosure, however, the medium-boiling solvent having a boiling point of 180° to 270° C. substantially accounts for 30 to 100 wt. % of a solvent component in the oil phase. When the stencil printing press is allowed to stand for a long period of time with being supplied with the above-mentioned emulsion ink, the medium-boiling solvent in the oil phase and the water content in the water phase evaporate. Therefore, when the amount ratio of a nonvolatile solvent contained in the emulsion ink remaining on a drum of the stencil printing press is small, a resin component contained in the emulsion ink is completely or nearly hardened. Such a hardened resin component adheres to a drum mesh to clog it up, or adheres to an ink roller to make the ink roller immovable.

SUMMARY OF THE INVENTION

It is therefore an object of the present invention to provide a W/O emulsion ink free from the above-mentioned problems, capable of performing the stencil printing in good conditions.

The above object of the present invention can be achieved by a W/O emulsion ink for use in stencil printing comprising an oil phase and a water phase with the respective ratios by wt. % thereof being (20 to 40):(80 to 60), the oil phase comprising a solvent component which comprises a volatile solvent with an initial boiling point of 150° to 210° C. and a nonvolatile solvent with the respective ratios by wt. % thereof being (10 to 30):(90 to 70), a coloring agent, a resin, and a surface-active agent, with the amount of the resin in the oil phase being in the range of 2 to 8 wt. % of the total weight of the emulsion, and the water phase comprising water.

DETAILED DESCRIPTION OF THE PREFERRED EMBODIMENTS

In the W/O emulsion ink of the present invention, the solvent component in the oil phase comprises a volatile solvent with an initial boiling point of 150° to 210° C. and a nonvolatile solvent with the respective ratios by wt. % thereof being (10 to 30):(90 to 70). When the amount ratio of the volatile solvent is less than 10 wt. %, the viscosity of the ink is decreased while the emulsion ink is allowed to stand in the stencil printing press. As a result, the image density becomes excessively high, and the offset problem often occurs and blur on the images is easily caused. Furthermore, when the amount ratio of the volatile solvent exceeds 30 wt. %, the amount of the solvent to evaporate is increased while the stencil printing press is allowed to stand not in operation for a long period of time. Consequently, the amount ratio of the resin component contained in the oil phase of the emulsion ink is relatively increased. As a result, the resin component contained in the oil phase tends to be hardened, and the drum mesh is easily clogged with the emulsion ink with the increased viscosity. To prevent such a problem, the nonvolatile solvent is contained in the oil phase in the amount ratio of 90 to 70 wt. % of the total amount of the solvent component in the emulsion ink according to the present invention.

The volatile solvent contained in the oil phase in the emulsion ink of the present invention has an initial boiling point of 150° to 210° C. When the initial boiling point of the volatile solvent is lower than 150° C., it is impossible to prevent the change in the viscosity of the emulsion ink while the ink is allowed to stand over a long period of time.

With the volatile solvent having an initial boiling point of higher than 210° C., it is difficult to prevent a decrease of the viscosity of the emulsion ink after the ink is allowed to stand for a short period of time, namely, about one or two days.

The W/O emulsion ink of the present invention comprises the oil phase and the water phase with the respective ratios by wt. % thereof being (20 to 40):(80 to 60). The oil phase comprises at least the coloring agent, the resin component, the surface-active agent and the solvent component.

The amount ratio of the resin component contained in the oil phase is 2 to 8 wt. % of the total weight of the W/O emulsion ink of the present invention. When the amount ratio of the resin component in the oil phase is within the above range, the fixing properties of the printed images with respect to an image-receiving medium are excellent. In addition, when the stencil printing press is allowed to stand for a long period of time and the water content in the water phase and the volatile solvent in the oil phase evaporate, the amount ratio of the resin component in the oil phase is not so much increased that the increase of the viscosity of the ink can be prevented. Thus, the clogging of the drum mesh of the printing press caused by the ink with high viscosity can be avoided.

In the present invention, it is preferable that an aromatic component contained in the aforementioned volatile solvent be in an amount of 1 wt. % or less of the entire weight of the volatile solvent. When the amount of the aromatic component is decreased to 1 wt. % or less, there is no offensive odor peculiar to the aromatic component around the stencil printing press and the printed matter, and the environment is not polluted and the health of the operators is not in danger.

In addition, it is preferable that the W/O emulsion ink of the present invention have a viscosity in the range of 28 to 38 mm in terms of spread meter value at 20° C. in accordance with JIS K 5701. When the viscosity of the ink is within the above range, a sufficient image density can be obtained, and at the same time, the offset problem and the image blur do not occur.

Examples of the commercially available volatile solvent having an initial boiling point of 150° to 210° C. for use in the emulsion ink of the present invention are "ISOPAR G" (Trademark) solvent (initial boiling point: 158° C.), "ISOPAR H" (Trademark) solvent (initial boiling point: 174° C.), "ISOPAR L" (Trademark) solvent (initial boiling point: 188° C.), "ISOPAR M" (Trademark) solvent (initial boiling point: 207° C.), "EXXSOLD-40" (Trademark) solvent (initial boiling point: 159° C.), "EXXSOLD-60" (Trademark) solvent (initial boiling point: 186° C.), and "EXXSOLD-80" (Trademark) solvent (initial boiling point: 204° C.), which are made by Exxon Chemical Japan Ltd.; "ISOSOL 300" (Trademark) solvent (initial boiling point: 170° C.), which is made by Nippon Petrochemicals Co., Ltd.; and "IP SOLVENT 1620" (Trademark) solvent (initial boiling point: 166° C.) and "IP SOLVENT 2028" (Trademark) solvent (initial boiling point: 166° C.), which are made by Idemitsu Petrochemical Co., Ltd.

As the nonvolatile solvent for use in the emulsion ink of the present invention, a motor oil, a spindle oil, an olive oil, a castor oil, or a salad oil can be used.

As the coloring agent for use in the oil phase of the emulsion ink of the present invention, conventional coloring agents such as carbon black, phthalocyanine blue, phthalocyanine green, and lake red can be used.

As the resin for use in the oil phase of the emulsion ink of the present invention, a rosin-modified phenolic resin, a maleic acid resin, or an alkyd resin can be employed.

Examples of the surface-active agent for use in the oil phase of the emulsion ink of the present invention are higher fatty acid esters of sorbitan such as sorbitan monolaurate, sorbitan monopalmitate, sorbitan monostearate, sorbitan tristearate, sorbitan monooleate, sorbitan trioleate, and sorbitan sesquioleate; fatty acid monoglyceride such as oleic acid monoglyceride; oleic acid diglyceride; and ethylene oxide adducts of higher alcohol, alkyl phenol, and fatty acid.

Furthermore, the water phase may comprise as an antifreezing agent polyhydric alcohols such as ethylene glycol, propylene glycol, sorbitol, and glycerin.

In addition, the water phase may comprise, as an antiseptic agent, phenols, sorbic acid, salycylic acid, or p-oxybenzoic acid; and as a water-evaporation preventing agent, a water-soluble resin, such as carboxymethylcellulose, gum arabic or sodium alginate.

The emulsion ink of the present invention can be prepared in the following manner.

A resin is added to a nonvolatile solvent and dissolved therein by the application of heat thereto. After the thus obtained mixture was cooled, a surface-active agent and a coloring agent are added to the mixture, and kneaded in a three-roll mill. With the addition of a volatile solvent to the above obtained mixture, an oil phase is prepared. A water phase is gradually added to this oil phase to prepare an emulsion, whereby a W/O emulsion ink of the present invention is obtained.

Other features of this invention will become apparent in the course of the following description of exemplary embodiments, which are given for illustration of the invention and are not intended to be limiting thereof.

EXAMPLE 1

[Preparation of Oil Phase]

4.0 parts by weight of a rosin-modified phenolic resin were dissolved in 15.0 parts by weight of motor oil #30 serving as a nonvolatile solvent at 180° C. After cooling the thus obtained solution, 3.5 parts by weight of furnace carbon black serving as a coloring agent and 4.0 parts by weight of sorbitan sesquioleate serving as a surface-active agent were added to the above obtained solution, and the thus obtained mixture was thoroughly kneaded in a three-roll mill. To this mixture, 3.5 parts by weight of "ISOPAR L" (Trademark) solvent made by Exxon Chemical Japan Ltd., having an initial boiling point of 188° C. and containing an aromatic component of 0.1 wt. % were added as a volatile solvent, so that an oil phase was obtained.

[Preparation of Water Phase]

10.0 parts by weight of ethylene glycol serving as an antifreezing agent and 0.1 parts by weight of methyl paraoxybenzoate serving as an antiseptic agent were dissolved in 59.9 parts by weight of water, so that a water phase was obtained.

The above obtained water phase was gradually added to the previously obtained oil phase with stirring in a stirring mill, whereby a W/O emulsion ink No. 1 of the present invention was obtained.

The spread meter value of the above obtained emulsion ink was 32 mm at 20° C.

Images were printed by using a commercially available stencil printing rotary press of central cylinder type (Trademark solvent "PRIPORT VT-3500", made by Ricoh Company, Ltd.) equipped with the above obtained emulsion ink No. 1 of the present invention. The density of printed images was 0.95 when measured with a Macbeth densitometer RD-914. There was neither offset problem nor image blur.

After printing, the emulsion ink was allowed to stand in the rotary press for 64 hours. Then, images were printed again under the same conditions as above. The image density was 0.98, and there was no problem with respect to the offset and image blur. It was confirmed that the image quality did not deteriorate. Furthermore, the printed matter left no unpleasant odor.

Comparative Example 1

The procedure for preparing the emulsion ink in Example 1 was repeated except that "ISOPAR L" (Trademark) solvent serving as the volatile solvent in the oil phase employed in Example 1 was replaced by "Mineral Spirit A" (Trademark) solvent made by Nippon Petrochemicals Co., Ltd., having an initial boiling point of 152° C. and containing an aromatic component of 6.5 wt. %, whereby a comparative W/O emulsion ink No. 1 was obtained.

Using the above obtained comparative emulsion ink No. 1, images were printed in the same manner as in Example 1, so that the initial image quality and the image density after the emulsion ink was allowed to stand for 64 hours were as good as in Example 1. However, an unpleasant odor peculiar to an aromatic component was exhaled from the printed matter and the printing press.

EXAMPLE 2

The procedure for preparing the emulsion ink in Example 1 was repeated except that 15.0 parts by weight of motor oil #30 serving as the nonvolatile solvent and 3.5 parts by weight of "ISOPAR L" (Trademark) solvent serving as the volatile solvent used in preparation of the oil phase employed in Example 1 were respectively replaced by 13.0 parts by weight of a spindle oil and 5.5 parts by weight of "ISOPAR G" (Trademark) solvent made by Exxon Chemical Japan Ltd., having an initial boiling point of 158° C. and containing an aromatic component of 0.08 wt. %, whereby a W/O emulsion ink No. 2 of the present invention was obtained.

Using the above obtained emulsion ink No. 2 according to the present invention, images were printed in the same manner as in Example 1, and the initial image quality and the image quality obtained after the emulsion ink was allowed to stand for 64 hours were measured. The results are shown in Table 1.

Comparative Example 2

The procedure for preparing the emulsion ink in Example 2 was repeated except that the amount of the spindle oil employed as the nonvolatile solvent in Example 2 was changed from 13.0 parts by weight to 18.5 parts by weight, and "ISOPAR G" (Trademark) solvent employed as the volatile solvent in Example 2 was not used, whereby a comparative W/O emulsion ink No. 2 was obtained.

Using the above obtained comparative emulsion ink No. 2, images were printed in the same manner as in Example 1, and the initial image quality and the image quality obtained after the emulsion ink was allowed to stand for 64 hours were measured. The results are shown in Table 1.

Comparative Example 3

The procedure for preparing the emulsion ink in Example 2 was repeated except that the amount of the spindle oil used as the nonvolatile solvent in Example 2 was changed from 13.0 parts by weight to 10.0 parts by weight and 5.5 parts by weight of "ISOPAR G" (Trademark) solvent used as the volatile solvent in Example 2 was replaced by 8.5 parts by weight of "ISOPAR H" (Trademark) solvent made by Exxon Chemical Japan Ltd., having an initial boiling point of 170° C. and containing an aromatic component of 0.7 wt. %, whereby a comparative W/O emulsion ink No. 3 was obtained.

Using the above obtained comparative emulsion ink No. 3, images were printed in the same manner as in Example 1, and the initial image quality and the image quality obtained after the emulsion ink was allowed to stand for 64 hours were measured. The results are shown in Table 1.

EXAMPLE 3

[Preparation of Oil Phase]

2.0 parts by weight of a rosin-modified phenolic resin were dissolved in 12.5 parts by weight of a spindle oil serving as a nonvolatile solvent at 180° C. After cooling the thus obtained solution, 3.5 parts by weight of furnace carbon black serving as a coloring agent and 4.0 parts by weight of sorbitan sesquioleate serving as a surface-active agent were added to the above obtained solution, and the thus obtained mixture was thoroughly kneaded in a three-roll mill. To this mixture, 3.0 parts by weight of "IP SOLVENT 1620" (Trademark) solvent made by Idemitsu Petrochemical Co., Ltd., having an initial boiling point of 166° C. and containing an aromatic component of 0.2 wt. % were added as a volatile solvent, so that an oil phase was obtained.

[Preparation of Water Phase]

10.0 parts by weight of ethylene glycol serving as an antifreezing agent and 0.1 parts by weight of methyl paraoxybenzoate serving as an antiseptic agent were dissolved in 64.5 parts by weight of water, so that a water phase was obtained.

The above obtained water phase was gradually added to the previously obtained oil phase with stirring in a stirring mill, whereby a W/O emulsion ink No. 3 of the present invention was obtained.

Using the above obtained emulsion ink No. 3 according to the present invention, images were printed in the same manner as in Example 1, and the initial image quality and the image quality obtained after the emulsion ink was allowed to stand for 64 hours were measured. The results are shown in Table 1.

EXAMPLE 4

[Preparation of Oil Phase]

8.0 parts by weight of a rosin-modified phenolic resin were dissolved in 16.0 parts by weight of a spindle oil serving as a nonvolatile solvent at 180° C. After cooling the thus obtained solution, 3.5 parts by weight of furnace carbon black serving as a coloring agent and 4.0 parts by weight of sorbitan sesquioleate serving as a surface active agent were added to the above obtained solution, and the thus obtained mixture was thoroughly kneaded in a three-roll mill. To this mixture, 3.5 parts by weight of "IP SOLVENT 1620" (Trademark) solvent made by Idemitsu Petrochemical Co., Ltd., having an initial boiling point of 166° C. and containing an aromatic component of 0.2 wt. % were added as a volatile solvent, so that an oil phase was obtained.

[Preparation of Water Phase]

10.0 parts by weight of ethylene glycol serving as an antifreezing agent and 0.1 parts by weight of methyl paraoxybenzoate serving as an antiseptic agent were dissolved in 54.9 parts by weight of water, so that a water phase was obtained.

The above obtained water phase was gradually added to the previously obtained oil phase with stirring in a stirring mill, whereby a W/O emulsion ink No. 4 of the present invention was obtained.

Using the above obtained emulsion ink No. 4 according to the present invention, images were printed in the same manner as in Example 1, and the initial image quality and the image quality obtained after the emulsion ink was allowed to stand for 64 hours were measured. The results are shown in Table 1.

Comparative Example 4

The procedure for preparing the emulsion ink in Example 3 was repeated except that the amount of the spindle oil was changed from 12.5 parts by weight to 13.5 parts by weight and the amount of the rosin-modified phenolic resin was changed from 2.0 parts by weight to 1.0 parts by weight in preparation of the oil phase in Example 3, whereby a comparative W/O emulsion ink No. 4 was obtained.

Using the above obtained comparative emulsion ink No. 4, images were printed in the same manner as in Example 1, and the initial image quality and the image quality obtained after the emulsion ink was allowed to stand for 64 hours were measured. The results are shown in Table 1.

Comparative Example 5

The procedure for preparing the emulsion ink in Example 4 was repeated except that the amount of the spindle oil was changed from 16.0 parts by weight to 13.0 parts by weight, the amount of the rosin-modified phenolic resin was changed from 8.0 parts by weight to 9.0 parts by weight and the amount of "IP SOLVENT 1620" (Trademark) solvent was changed from 3.5 parts by weight to 5.5 parts by weight in preparation of the oil phase in Example 4, whereby a comparative W/O emulsion ink No. 5 was obtained.

Using the above obtained comparative emulsion ink No. 5, images were printed in the same manner as in Example 1, and the initial image quality and the image quality obtained after the emulsion ink was allowed to stand for 64 hours were measured. The results are shown in Table 1.

TABLE 1

| Example No. | Image Density initial stage | Image Density after allowing ink to stand for 64 hours | Offset (*) initial stage | Offset (*) after allowing ink to stand for 64 hours | Blur on Image () initial stage | Blur on Image () after allowing ink to stand for 64 hours | Fixing Properties (*) initial stage | Fixing Properties (*) after allowing ink to stand for 64 hours |
|---|---|---|---|---|---|---|---|---|
| Ex. 1 | 0.95 | 0.98 | o | o | o | o | o | o |
| Ex. 2 | 1.01 | 0.95 | o | o | o | o | o | o |
| Ex. 3 | 1.00 | 1.05 | o | o | o | o | o | o |
| Ex. 4 | 0.93 | 0.94 | o | o | o | o | ⊙ | o |
| Comp. Ex. 1 | 0.99 | 1.00 | o | o | o | o | o | o |
| Comp. Ex. 2 | 0.95 | 1.20 | o | x | o | x | o | o |
| Comp. Ex. 3 | 1.00 | 0.60 | o | o | o | o | o | o |
| Comp. Ex. 4 | 1.12 | 1.15 | o | Δ | o | Δ | x | x |
| Comp. Ex. 5 | 0.70 | 0.45 | o | o | o | o | ⊙ | ⊙ |

| Example No. | Spread Meter Value initial stage | Spread Meter Value after allowing ink to stand for 64 hours | Offensive Odor of Printed Matter (**) | Clogging of Drum Mesh after Allowing Ink to Stand for One Month (***) |
|---|---|---|---|---|
| Ex. 1 | 32 | 34 | o | o |
| Ex. 2 | 33 | 31 | o | o |
| Ex. 3 | 34 | 35 | o | o |
| Ex. 4 | 30 | 31 | o | o |
| Comp. Ex. 1 | 33 | 34 | x | o |
| Comp. Ex. 2 | 31 | 40 | o | o |
| Comp. Ex. 3 | 35 | 27 | o | Δ |
| Comp. Ex. 4 | 39 | 41 | o | o |
| Comp. Ex. 5 | 25 | 20 | o | x |

(*) o: No problem, Δ: Slightly observed, x: Considerably observed
(**) ⊙: Entirely no blur, o: Almost no blur, Δ: Slight blur, x: Considerable blur
(***) ⊙: Excellent, o: Good, Δ: Slightly poor, x: Poor
(****) o: Absent, x: Present
(*****) o: No clogging, Δ: Slight clogging, x: Clogging The drum mesh of the stencil printing press is not clogged with the W/O emulsion ink according to the present invention even when the ink is allowed to stand in the press for a long period of time. Furthermore, the changes in the viscosity of the ink is so effectively controlled that the proper density of printed images can be obtained. Consequently, the offset problem and the image blur can be prevented.

What is claimed is:

1. A W/O emulsion ink for use in stencil printing comprising an oil phase and a water phase with the respective ratios by wt. % thereof being (20 to 40):(80 to 60), said oil phase comprising a solvent component which comprises a volatile solvent with an initial boiling point of 150° to 210° C. and a nonvolatile solvent, with the respective ratios by wt. % thereof being (10 to 30):(90 to 70), a coloring agent, a resin, and a surface-active agent, with the amount of said resin in said oil phase being in the range of 2 to 8 wt. % of the total weight of said emulsion, and said water phase comprising water.

2. The W/O emulsion ink as claimed in claim 1, wherein said volatile solvent comprises an aromatic component in an amount of 1 wt. % or less of the entire weight of said volatile solvent.

3. The W/O emulsion ink as claimed in claim 1, with the viscosity thereof being in the range of 28 to 38 mm in terms of spread meter value at 20° C.

4. The W/O emulsion ink as claimed in claim 1, wherein said water phase further comprises an antifreezing agent, an antiseptic agent, and a water-evaporation preventing agent.

* * * * *